UNITED STATES PATENT OFFICE.

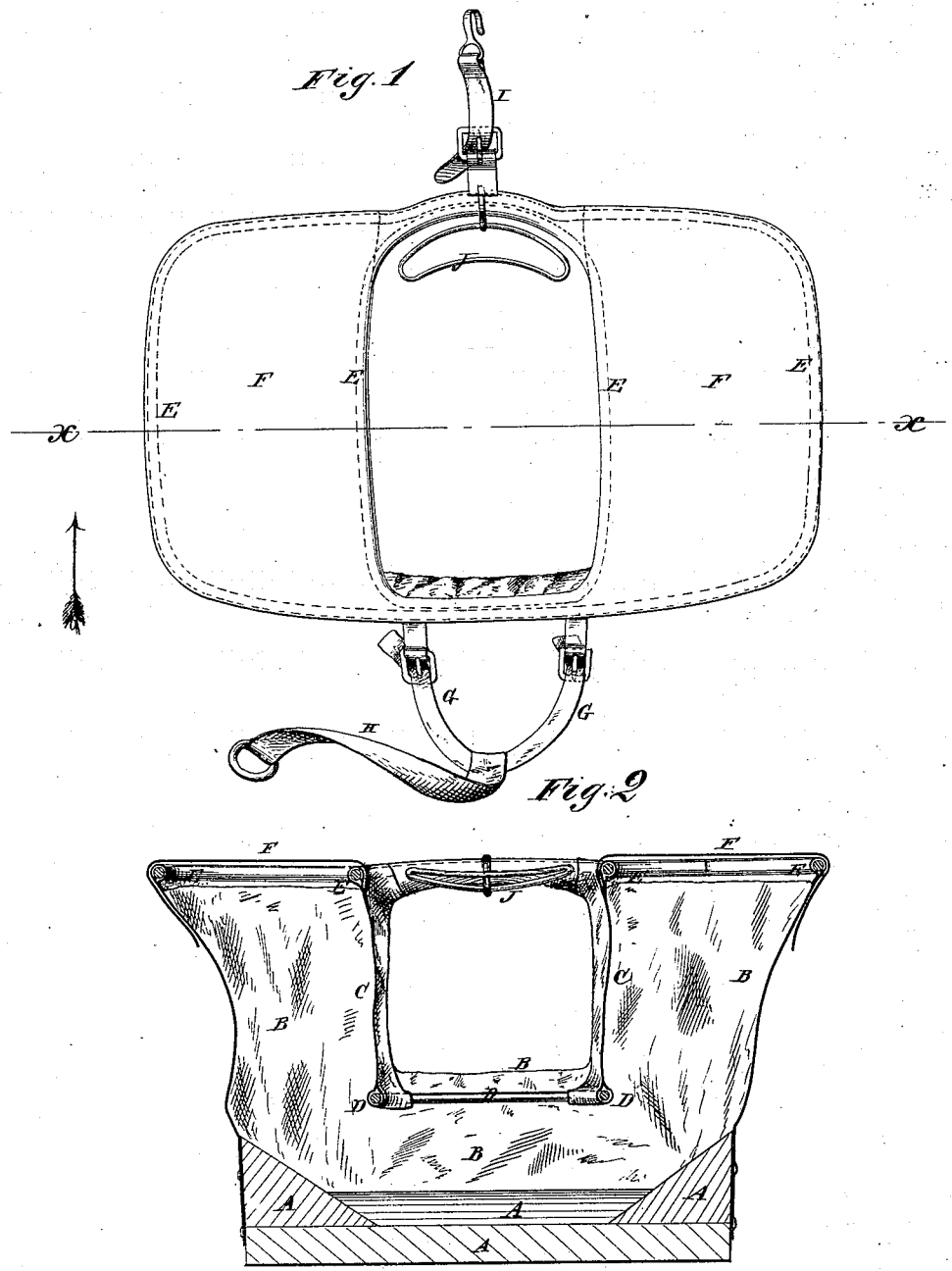

THOMAS R. LOWERRE, OF MOTT HAVEN, (MORRISANIA STATION,) NEW YORK, ASSIGNOR TO HIMSELF AND RICHARD U. WRIGHT, OF SAME PLACE.

IMPROVEMENT IN FEED-BAGS.

Specification forming part of Letters Patent No. 195,030, dated September 11, 1877; application filed July 23, 1877.

*To all whom it may concern:*

Be it known that I, THOMAS R. LOWERRE, of Mott Haven, (Morrisania station,) in the county and State of New York, have invented a new and useful Improvement in Feed-Bags, of which the following is a specification:

Figure 1 is a top view of my improved feed-bag. Fig. 2 is a detail vertical section of the same, taken through the line $x\, x$, Fig. 1.

Similar letters of reference indicate corresponding parts.

The object of this invention is to furnish an improved feed-bag for horses, which shall be so constructed as to allow the oats to pass down to the horse's mouth as fast as he eats them, and no faster, which will allow the horse to have plenty of air while eating, which shall be evenly balanced, so that the horse can eat comfortably, and which will prevent the oats from being thrown out by the horse.

The invention will first be described in connection with the drawing, and then pointed out in claim.

A represents the bottom of the feed-bag, which may be made of wood or sheet metal, and which is made concaved, so that the grain may pass to the center, directly beneath the horse's mouth. B is the body of the feed-bag, which is divided by two partitions, C, into three compartments—a central compartment, into which the horse's nose is inserted, and two side compartments, in which the grain is placed.

The lower edges of the partitions C extend nearly to the bottom A of the bag, space being left beneath said edges for the grain to pass slowly into the bottom of the central compartment as fast as the horse eats it.

To the lower edges of the partitions C and to the middle part of the front and rear sides of the bag B is attached a wire frame, D, to prevent the partitions C from bulging inward against the horse's nose. The upper edges of the bag B and of the partitions C are kept in place by a wire frame, E.

The side compartments are covered with canvas flaps or covers, F, which are attached to the inner cross-bars of the frame E, and are provided with flanges upon their sides and outer ends, which are drawn down over the frame E. The covers F prevent the grain from spilling out of the side compartments, however full said compartments may be.

To the rear side of the frame E, upon the opposite sides of and equally distant from its center, are attached the ends of a strap, G, which passes over the horse's head just behind his ears, and which is made adjustable in length by buckles.

From the center of the strap G a strap, H, passes between the horse's ears and down his face, and has a ring attached to its end to receive a hook attached to the end of a strap, I, the other end of which is attached to the center of the front side of the frame E. The strap I is made adjustable in length by a buckle.

In the forward side of the bag is formed a large hole to admit air, which opening may be covered with wire-gauze, if desired, but which I prefer to leave uncovered.

To the middle part of the front of the frame E is hinged a wire loop, J, which is designed to be turned down against the horse's forehead, when the bag has been adjusted in place, to prevent the horse from putting his nose out through the hole in the front of the said bag, and also to cause the bag to set better.

Having thus described my invention, I claim as new and desire to secure by Letters Patent—

In a feed-bag, the combination, with the partitions C, of flanged covers F and wire frame E, constructed and arranged as and for the purpose specified.

THOMAS R. LOWERRE.

Witnesses:
 JAMES T. GRAHAM,
 C. SEDGWICK.